(12) United States Patent
Yamaoka et al.

(10) Patent No.: US 6,417,904 B1
(45) Date of Patent: Jul. 9, 2002

(54) OPTICALLY COMPENSATORY FILM, OPTICALLY COMPENSATORY POLARIZING PLATE AND LIQUID-CRYSTAL DISPLAY DEVICE

(75) Inventors: Takashi Yamaoka; Hiroyuki Yoshimi, both of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/660,243

(22) Filed: Sep. 12, 2000

(30) Foreign Application Priority Data

Sep. 13, 1999 (JP) .......................... 11-258287
Sep. 22, 1999 (JP) .......................... 11-269058

(51) Int. Cl.[7] ................. G02F 1/1333; G02F 1/1335; B05D 5/10
(52) U.S. Cl. .................. 349/117; 349/96; 349/122; 428/208.4
(58) Field of Search ................ 349/122, 117, 349/119, 96; 359/494; 428/354, 343; 427/208.04

(56) References Cited

U.S. PATENT DOCUMENTS

| | | | | |
|---|---|---|---|---|
| 4,358,494 A | * | 11/1982 | Akimoto et al. | 427/208.8 |
| 4,387,133 A | * | 6/1983 | Ichikawa et al. | 428/215 |
| 5,818,559 A | * | 10/1998 | Yoshida | 349/122 |
| 5,880,800 A | * | 3/1999 | Mikura et al. | 349/122 |
| 5,892,561 A | * | 4/1999 | Suzuki et al. | 349/122 |

* cited by examiner

Primary Examiner—Toan Ton
(74) Attorney, Agent, or Firm—Sughrue Mion, PLLC

(57) ABSTRACT

An optically compensatory film in which a birefringent phase retarder layer is adhesively supported by a transparent film base is provided. The transparent film base has a specific gravity of not larger than 1.15 or a water absorption coefficient of not higher than 1.0% (at 23° C. and for 24 hours), and has an photoelastic coefficient of not larger than $30 \times 10^{-12}$ $m^2$/N. An optically compensatory polarizing plate is constituted of a laminate of the optically compensatory film and a polarizing plate, the optically compensatory film including a phase retarder layer composed of a liquid-crystal polymer. A liquid-crystal display device in which the optically compensatory film or a combination of the optically compensatory film and a polarizing plate are disposed on at least one side of a liquid-crystal cell is provided.

14 Claims, 1 Drawing Sheet

OPTICALLY COMPENSATORY FILM, OPTICALLY COMPENSATORY POLARIZING PLATE AND LIQUID-CRYSTAL DISPLAY DEVICE

BACKGROUND OF THE INVENTION

1. Field of the Invention

The present invention relates to an optically compensatory film adapted for forming a good-visibility liquid-crystal display device, exhibiting stable birefringence characteristic to an external stimulus such as heat and humidity, and excellent in weight saving, and a polarizing plate laminated with the optically compensatory film.

The present application is based on Japanese Patent Applications No. Hei. 11-258287 and 11-269058, which are incorporated herein by reference.

2. Description of the Related Art

Heretofore, there is known an optically compensatory film having a cellulose film base, and a gradient orientation layer of a discotic liquid-crystal polymer provided on the base. The film has an advantage that phase difference characteristic based on a gradient of its main refractive index in an in-plane direction with respect to a surface of the base compensates for the phase difference between liquid-crystal cells to thereby enlarge a viewing angle range permitting good visibility.

The birefringence characteristic of the optically compensatory film was, however, apt to be changed by an external stimulus such as heat and humidity. Hence, there was a problem that the compensating effect of the optically compensatory film became partially different to cause distortion in display and that the weight per unit area of the optically compensatory film was heavy. The increase of screen size has been required of a liquid-crystal display device, or the like. In the case, the heavy weight of the optically compensatory film-was a serious worry.

SUMMARY OF THE INVENTION

An object of the present invention is to develop an optically compensatory film exhibiting birefringence characteristic hardly changed by an external stimulus such as heat and humidity, excellent in stability of the birefringence characteristic and excellent in weight saving per unit area.

According to a first aspect of the present invention, there is provided an optically compensatory film comprising a transparent film base, and a birefringent phase retarder layer adhesively supported by said transparent film base, said transparent film base having a specific gravity of not larger than 1.15 and having an photoelastic coefficient of not larger than $30 \times 10^{-12}$ $m^2/N$. And an optically compensatory polarizing plate comprising a laminate of the above optically compensatory film and a polarizing plate is provided, wherein the phase retarder layer of said optically compensatory film is composed of a liquid-crystal polymer. Further, a liquid-crystal display device comprising a liquid-crystal cell is provided, wherein the above optically compensatory film or a combination of the optically compensatory film and a polarizing plate is disposed on at least one side of said liquid-crystal cell.

According to the first aspect of the present invention, there can be provided an optically compensatory film exhibiting birefringence characteristic hardly changed by an external stimulus such as heat and excellent in weight saving per unit area. The optically compensatory film can be adapted for reliably forming a liquid-crystal display device excellent in weight saving in spite of a large screen size, exhibiting a stable compensating effect, and excellent in uniformity of display quality to make visibility property good.

According to a second aspect of the present invention, there is provided an optically compensatory film comprising a transparent film base, and a birefringent phase retarder layer adhesively supported by said transparent film base, said transparent film base having a water absorption coefficient of not higher than 1.0% (at 23° C. and for 24 hours) and having an photoelastic coefficient of not larger than $30 \times 10^{-12}$ $m^2/N$. And an optically compensatory polarizing plate comprising a laminate of the above optically compensatory film and a polarizing plate is provided, wherein the phase retarder layer of said optically compensatory film is composed of a liquid-crystal polymer. Further, a liquid-crystal display device comprising a liquid-crystal cell is provided, wherein the above optically compensatory film or a combination of the optically compensatory film and a polarizing plate is disposed on at least one side of said liquid-crystal cell.

According to the second aspect of the present invention, there can be obtained the same effect as that of the first aspect of the present invention. This is based on the fact in the second aspect that the coefficient of water absorption of a transparent film base in the optically compensatory film is controlled.

That is, the inventors of the present invention have made investigation and investigation eagerly to overcome the problem of the change of the birefringence characteristic. In the meantime, it has been found that the size of a cellulose polymer constituting a transparent film base in the background-art optically compensatory film varies widely in accordance with the change in quantity of water absorption and that the cause of the problem is the influence of the change of the size on the birefringence characteristic of the optically compensatory film. The inventors have succeeded in controlling the change of the birefringence characteristic by controlling the coefficient of water absorption of the transparent film base into the foregoing range.

Features and advantages of the invention will be evident from the following detailed description of the preferred embodiments described in conjunction with the attached drawings.

DETAILED DESCRIPTION OF THE PREFERRED EMBODIMENTS

Figure 1:
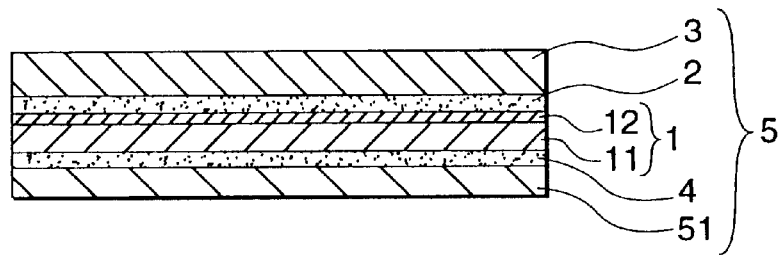
FIG. 1 shows a sectional view of an example of the configuration of the optically compensatory polarizing plate.

An optically compensatory film according to the first aspect of the present invention comprises a transparent film base, and a birefringent phase retarder layer adhesively supported by the transparent film base, the transparent film base having a specific gravity of not higher than 1.15 and having a photoelastic coefficient of not larger than $30 \times 10^{-12} m^2/N$. An example of the optically compensatory film is shown in FIG. 1. In FIG. 1, the reference numeral 1 designates an optically compensatory film; 11, a transparent film base; and 12, a birefringent phase retarder layer. Incidentally, FIG. 1 shows the case where the optically compensatory film is applied to an optically compensatory polarizing plate 5. In FIG. 1, the reference numeral 3 designates a polarizing plate; and 2 and 4, an adhesive layer. Further, the reference numeral 51 designates a separator temporarily stuck to the adhesive layer 4 to thereby protect the adhesive layer 4.

The transparent film base in the optically compensatory film according to the first aspect is provided to adhesively support the phase retarder layer. A film of a transparent polymer having a specific gravity of not higher than 1.15 and having a photoelastic coefficient of not larger than $30 \times 10^{-12} m^2/N$ is used as the transparent film base. The use of such a film permits the transparent film base to be excellent in weight saving, stable an external stimulus such as heat and excellent in uniformity of birefringence characteristic on its whole surface.

The transparent film base preferred from the point of view of weight saving is a base having a specific gravity of not higher than 1.12, especially, not higher than 1.10, more especially not higher than 1.08. The transparent film base preferred from the point of view of stability of birefringence characteristic, or the like, is a base having a photoelastic coefficient of not larger than $20 \times 10^{-12} m^2/N$, especially not larger than $15 \times 10^{-12} m^2/N$, more especially not larger than $10 \times 10^{-12} m^2/N$.

An optically compensatory film according to the second aspect of the present invention comprises a transparent film base, and a birefringent phase retarder layer adhesively supported by the transparent film base, the transparent film base having a water absorption coefficient of not higher than 1.0% (at 23° C. and for 24 hours) and having a photoelastic coefficient of not larger than $30 \times 10^{-12} m^2/N$. An example of the optically compensatory film according to the second aspect is also shown in FIG. 1 as similar to the first aspect.

The transparent film base in the optically compensatory film according to the second aspect is provided to adhesively support the phase retarder layer. A film of a transparent polymer having a water absorption coefficient of not higher than 1.0% and having a photoelastic coefficient of not larger than $30 \times 10^{-12} m^2/N$ is used as the transparent film base. The use of such a film permits the transparent film base to be stable an external stimulus such as humidity and excellent in uniformity of birefringence characteristic on its whole surface. Incidentally, the coefficient of water absorption is based on the change of weight owing to water absorption in the case where the transparent film base is immersed in water at 23° C. for 24 hours (this rule applies hereinafter).

The preferred from the point of view of prevention of the size change owing to water absorption to keep birefringence characteristic is a transparent film base having a water absorption coefficient of not higher than 0.8%, especially not higher than 0.6%, more especially not higher than 0.4%. The preferred from the point of view of stability of birefringence characteristic is a transparent film base having a photoelastic coefficient of not larger than $20 \times 10^{-12} m^2/N$, especially not larger than $15 \times 10^{-12} m^2/N$, more especially $10 \times 10^{-12} m^2/N$.

The transparent film base satisfying the foregoing water absorption coefficient range and the photoelastic coefficient range simultaneously can be formed of a polymer having a bulky saturated cyclic structure in a molecule such as an acrylic polymer or a hydrogenated norbornene polymer having an alicyclic structure, especially of a polymer having no hydrophilic group or two or less hydrophilic groups per component monomer.

The transparent film base satisfying the specific gravity range or water absorption coefficient range and the photoelastic coefficient range can be formed, for example, of a polymer having a bulky saturated cyclic structure in a molecule, such as an acrylic polymer or a hydro norbornene polymer having an alicyclic structure. Especially, the polymer has at least one cyclic structure per component monomer, or has no hydrophilic group or two or less hydrophilic groups per component monomer.

When such a polymer is molded into a film by a suitable method, the resulting film can be provided as the transparent film base. For example, a film molded by a casting method, excellent in uniformity of thickness and having a phase difference as small as possible can be preferably used as the transparent film base. The thickness of the transparent film base can be determined suitably in accordance with strength, or the like. Generally, for the purpose of. weight saving, or the like, the thickness of the transparent film base is set to be not larger than 500 $\mu$m, especially in a range of from 5 to 300 $\mu$m, more especially in a range of from 10 to 200 $\mu$m.

The birefringent phase retarder layer adhesively supported by the transparent film base is provided for the purposes of compensating for the phase difference based on birefringence of a liquid-crystal cell, to thereby prevent coloring or the like due to change in viewing angle based by the phase difference and for the purpose of enlarging the viewing angle range for good visibility, etc. The birefringent phase retarder layer can be formed, for example, of a suitable birefringent phase retarder layer such as a stretched film layer or an orientation layer of a liquid-crystal polymer in accordance with the purposes. Incidentally, for enlargement of the viewing angle range, a gradient orientation layer of a discotic liquid-crystal polymer, or the like, can be used advantageously.

Incidentally, the adhesive support of the birefringent phase retarder layer by the transparent film base can be achieved by a suitable method such as a method of sticking a film through an adhesive layer or a method of applying a polymer solution as occasion demands. For orientation of a liquid-crystal polymer, an oriented film such as a layer treated by rubbing may be interposed as occasion demands. The thickness of the phase retarder layer can be determined suitably in accordance with the target phase difference, or the like. Generally, the thickness of the phase retarder layer is set to be not larger than 300 $\mu$m, especially in a range of from 0.1 to 100 $\mu$m, more especially in a range of from 0.5 to 50 $\mu$m.

The optically compensatory film according to the present invention can be preferably used for formation of a liquid-crystal display device, or the like. In practical use, a polarizing plate 3 may be laminated on the optically compensatory film so that the resulting laminate is used as an optically compensatory polarizing plate 5 as shown in FIG. 1. Such lamination may be performed when the display device is assembled up. On the other hand, a method in which the optically compensatory polarizing plate is formed by such lamination in advance has an advantage upon prevention of variations in quality, improvement of efficiency in assembling of the liquid-crystal display device, etc.

A suitable material can be used as the polarizing plate. The material is not particularly limited in kind. Incidentally, examples of the material are a polarizing film obtained by adsorbing iodine and/or dichromatic dye onto a hydrophilic high-molecular film such as a polyvinyl alcohol film, a partially formalized polyvinyl alcohol film, a partially saponified ethylene-vinyl acetate copolymer film or a cellulose. film and by stretching the hydrophilic high-molecular film, and a polarizing film composed of a polyene-oriented film such as dehydrated polyvinyl alcohol or dehydrochlorinated polyvinyl chloride. The thickness of the polarizing film is generally in a rage of from 5 to 80 µm but is not limited thereto.

The polarizing plate may be constituted by the polarizing film alone or may further have a transparent protective layer provided on a single side of the polarizing film or transparent protective layers provided on both sides of the polarizing film. The polarizing plate may further have a suitable optical layer such as any kind of anti-reflection layer of an interference film for the purpose of suppressing surface reflection or any kind of light diffusing layer for the purpose of diffusing surface-reflected light to achieve anti-glare, or the like.

Incidentally, the transparent protective layer can be formed by a suitable method such as a film laminating method or a film coating method. A suitable transparent resin can be used for the formation of the transparent protective layer. The preferred is a transparent protective layer excellent in transparency, mechanical strength, heat stability, moisture-shielding property, isotropy, etc. Examples of the material of the transparent protective layer include: cellulose resins such as cellulose triacetate, plastics such as polyester, polycarbonate, polyamide, polyimide, polyether-sulfone, polysulfone, polystyrene and acrylic resin, polyolefin; heat- or ultraviolet-curable resins such as acrylic resin, urethane resin, acrylic-urethane resin, epoxy resin and silicone resin; and so on.

The optically compensatory film 1 and the polarizing plate 3 are bonded to each other by a suitable method so that the resulting laminate can be obtained as the optically compensatory polarizing plate 5. Bonding the two by an adhesive layer 2 as shown in FIG. 1 is preferably used from the point of view of simplicity of bonding, keeping optical characteristic stable in practical use, etc. A suitable adhesive agent such as an acrylic adhesive agent, a silicone adhesive agent, a polyester adhesive agent, a polyurethane adhesive agent, a polyamide adhesive agent, a polyether adhesive agent or a rubber adhesive agent can be preferably used for the formation of the adhesive layer. Especially, an acrylic adhesive agent can be preferably used from the point of view of optical transparency, adhesive property, weather resistance, etc.

The provision of the adhesive layer to the optically compensatory film or/and the polarizing plate can be achieved by a suitable method such as a method in which an adhesive solution is directly applied onto a predetermined surface of the optically compensatory film or/and the polarizing plate by a suitable spreading method such as a casting method or a coating method or a method in which an adhesive layer is once formed on a separator in accordance with the aforementioned method and then transferred onto a predetermined surface of the optically compensatory film or/and the polarizing plate. The thickness of the adhesive layer can be determined suitably in accordance with the adhesive force, etc. Generally, the thickness of the adhesive layer is set to be in a range of from 1 to 500 µm, especially in a range of from 5 to 200 µm, more especially in a range of from 10 to 100 µm.

An adhesive layer 4 for bonding and fixing the optically compensatory polarizing plate to a liquid-crystal cell, or the like, as shown in FIG. 1 can be provided to the optically compensatory polarizing plate as occasion demands. Generally, the adhesive layer 4 is provided on the optically compensatory film in the optically compensatory polarizing plate. The adhesive layer 4 can be formed and provided in the same manner as the adhesive layer 2. The adhesive layer 4 may be provided on the optically compensatory film in advance so that the adhesive layer 4 can be used for forming the optically compensatory polarizing plate.

As occasion demands, a separator 51, or the like, is temporarily bonded to the adhesive layer 4 as shown in FIG. 1 so that the adhesive layer 4 is covered with the separator 51 to prevent the adhesive force from being lowered because of contamination, or the like, until the adhesive layer 4 is used for the aforementioned bonding. A suitable known material can be used as the material of the separator 51. For example, a suitable thin leaf material such as a plastic film, a rubber sheet, a sheet of paper or cloth, a sheet of non-woven fabric, a net, a foamed sheet, a sheet of metal foil, a laminate thereof, or the like, can be used as the material of the separator 51. The thin leaf material may be coated with a suitable releasant such as a silicone releasant, a long chain alkyl releasant, a fluorine releasant, or the like, as occasion demands.

Incidentally, in the above description, the polarizing plate 3 may be provided either on the transparent film base 11 side of the optically compensatory film 1 or on the phase retarder layer 12 side of the optically compensatory film 1. When the optically compensatory film 1 and the polarizing plate 3 are laminated on each other, the respective optical axes of these can be disposed at a suitable arrangement angle in accordance with the target phase difference characteristic.

The transparent film base, the phase retarder layer and the polarizing plate, inclusive of the transparent protective layer, the adhesive layer (tacky layer), etc., which are constituent members of the optically compensatory film or optically compensatory polarizing plate, may be made to have ultraviolet light absorbing power, for example, by a method of treatment with an ultraviolet light absorber such as a salicylate compound, a benzophenol compound, a benzotriazole compound, a cyanoacrylate compound or a nickel complex salt compound as occasion demands.

The liquid-crystal display device according to the present invention comprises a liquid-crystal cell, and an optically compensatory film according to the present invention or a combination of the optically compensatory film and a polarizing plate, the optically compensatory film or the combination of the optically compensatory film and the polarizing plate being disposed on at least one side of the liquid-crystal cell. The polarizing plate may be provided as the foregoing optically compensatory polarizing plate. The liquid-crystal display device can be formed in the same manner as in the background art. That is, the liquid-crystal display device is generally formed by assembling the liquid-crystal cell, the polarizing plate and the optically compensatory film and further assembling other constituent parts such as an illumination system, etc., as occasion demands, and by incorporating a drive circuit into the resulting assembly. In the present invention, the liquid-crystal display device can be formed in the same manner as in the background art without any particular limitation except that the optically compensatory film according to the present invention or the combination of the optically compensatory film and the polarizing plate is used.

Hence, a liquid-crystal display device using a polarizing plate disposed on one or each side of the liquid-crystal cell or a suitable liquid-crystal display device as using a back-lighting unit or a reflection plate as an illumination system can be formed. In this case, the optically compensatory film, or the like, according to the present invention can be disposed on one or each side of the liquid-crystal cell. It is preferable from the point of view of the compensating effect that the optically compensatory film is located between-he polarizing plate and the liquid-crystal cell. It is especially preferable that the optically compensatory film is at least located on the visual side of the liquid-crystal cell.

Figure 2:
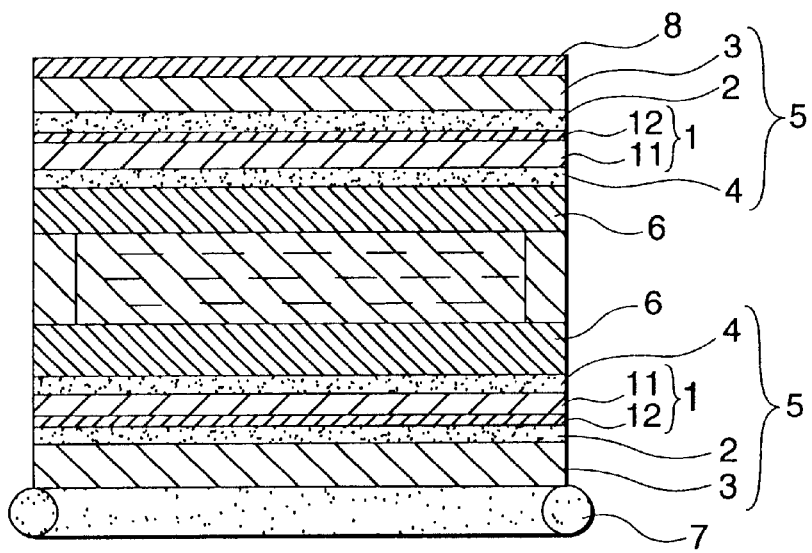
FIG. 2 shows a sectional view of an example of the configuration of the liquid-crystal display device.
Figure 3:
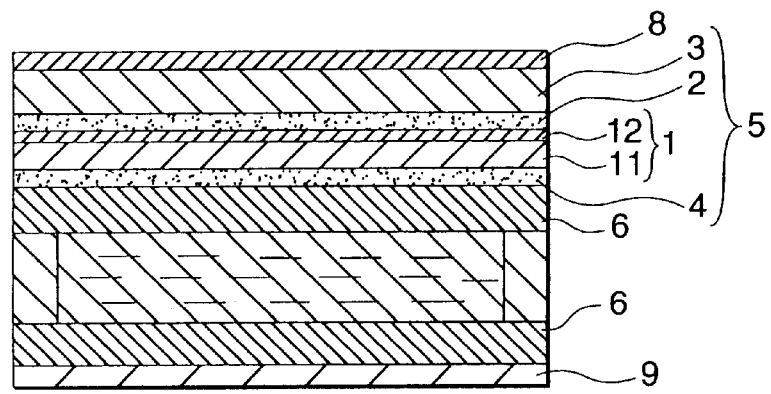
FIG. 3 shows a sectional view showing another example of the configuration of the liquid-crystal display device.

FIGS. 2 and 3 show examples of configuration of the aforementioned liquid-crystal display device. In FIGS. 2 and 3, the reference numeral 5 designates an optically compensatory polarizing plate; 6, a liquid-crystal cell; 7, a back-lighting system; and 9, a reflection layer. Incidentally, the reference numeral 8 designates a light diffusing plate. FIG. 2 shows a back-lighting illumination type in which optically compensatory polarizing plates 5 are disposed on both sides of the liquid-crystal cell 6. FIG. 3 shows a reflection illumination type in which an optically compensatory polarizing plate 5 is disposed only on a single side of the liquid-crystal cell.

Incidentally, the liquid-crystal cell may be of any optional type such as a TN type, an STN type, a π type, or the like. At least one suitable optical layer such as a diffusing plate, an anti-glare layer, an anti-reflection film, a protective plate, or the like, may be disposed in a suitable position when the liquid-crystal display device is formed.

EXAMPLE 1

A 0.5 μm-thick orientation film composed of a rubbed polyvinyl alcohol film was formed on a 100 μm-thick film base (Arton, made by JSR Corp.) of a norbornene resin with a specific gravity of 1.08 and a photoelectric coefficient of $4 \times 10^{-12}$ $m^2/N$. A mixture solution containing a triphenylene discotic liquid crystal having an ultraviolet-curable functional group, and a benzoin ether light initiator was applied onto the orientation film and heated to a temperature of 150° C. or higher to thereby form a discotic nematic phase. Then, the mixture

Comparative Example 1

An optically compensatory polarizing plate was obtained in the same manner as in Example 1 except that an optically compensatory film (WV A02A, made by Fuji Photo Film Co., Ltd.) having a gradient orientation layer of a discotic liquid-crystal polymer adhesively supported by a transparent film base of triacetyl cellulose with a specific gravity of 1.30 and a photoelectric coefficient of $5 \times 10^{-12}$ $m^2/N$ was used.

Evaluation Test 1

In each of the samples obtained in Examples 1, 2 and Comparative Example 1, the weight of the optically compensatory film was measured. In each of the samples, the optically compensatory polarizing plates were bonded to both sides of a glass plate through their adhesive layers so that the polarizing plates were arranged into the form of cross Nicol (a black display state with axes of polarization of 45 degrees and 135 degrees). The resulting laminate was subjected to a durability test in which the resulting laminate was heated at 80° C. for 120 hours. Then, the uniformity of the back state and the leakage of light were observed on a light table by eyes to evaluate display quality.

Results of the observation were shown in the following Table. solution was cured by ultraviolet light to thereby obtain an optically compensatory film in which a birefringent phase retarder layer composed of a 2.5 μm-thick liquid-crystal polymer layer was adhesively supported by the transparent film base. Incidentally, the liquid-crystal polymer layer was formed so that its main refractive index in an in-plane direction of the liquid-crystal molecules was parallel with the film base on the film base side but was oriented with a gradient with respect to the base on the free interface side being in contact with an air layer.

Then, a polarizing plate (HEG1425DU, made by Nitto Denko Corporation) provided with an adhesive layer was adhesively laminated on the foregoing optically compensatory film so that an axis of polarization of the polarizing plate coincided with an in-plane retardant phase axis of the optically compensatory film. Thus, an optically compensatory polarizing plate having an acrylic adhesive layer provided on the optically compensatory film side was obtained.

EXAMPLE 2

An optically compensatory film was obtained in the same manner as in Example 1 except that a 100 μm-thick film base of a norbornene resin (Zeonor, made by Nippon Zeon Co., Ltd.) with a specific gravity of 1.01 and a photoelectric coefficient of $6 \times 10^{-12}$ $m^2/N$ was used. An optically compensatory polarizing plate was obtained by use of the optically compensatory film.

|  | Weight ($g/m^2$) | Display Quality |
| --- | --- | --- |
| Example 1 | 109.5 | Good (*1) |
| Example 2 | 102.4 | Good (*1) |
| Comparative Example 1 | 131.1 | Bad owing to Light Leakage (*2) |

*1: Uniform black state with no light leakage.
*2: Irregular black state with partial light leakage.

EXAMPLE 3

A 0.5 μm-thick orientation film composed of a rubbed polyvinyl alcohol film was formed on a 100 μm-thick film base (OPTOREZ made by Hitachi Chemical Co., Ltd.) of an alicyclic acrylic resin with a water absorption coefficient of 0.6% and a photoelectric coefficient of $2 \times 10^{-12}$ $m^2/N$. A mixture solution containing a triphenylene discotic liquid crystal having an ultraviolet-curable functional group, and a benzoin ether light initiator was applied onto the orientation film and heated to a temperature of 150° C. or higher to thereby form a discotic nematic phase. Then, the mixture solution was cured by ultraviolet light to thereby obtain an optically compensatory film in which a birefringent phase retarder layer composed of a 2.5 μm-thick liquid-crystal polymer layer was adhesively supported by the transparent film base. Incidentally, the liquid-crystal polymer layer was formed so that its main refractive index in an in-plane direction of the liquid-crystal molecules was parallel with the film base on the film base side but was oriented with a gradient with respect to the base on the free interface side being in contact with an air layer.

Then, a polarizing plate (HEG1425DU, made by Nitto Denko Corporation) provided with an adhesive layer was adhesively laminated on the foregoing optically compensatory film so that an axis of polarization of the polarizing plate coincided with an in-plane retardant phase axis of the optically compensatory film. Thus, an optically compensatory polarizing plate having an acrylic adhesive layer provided on the optically compensatory film side was obtained.

EXAMPLE 4

An optically compensatory film was obtained in the same manner as in Example 3 except that a 100 μm-thick film base of a Malemido resin (TI-160, made by Tosoh Corp.) with a water absorption coefficient of 0.5% and a photoelectric coefficient of $7 \times 10^{-12}$ m$^2$/N was used. An optically compensatory polarizing plate was obtained by use of the optically compensatory film.

Comparative Example 2

An optically compensatory polarizing plate was obtained in the same manner as in Example 3 except that an optically compensatory film (WV A02A, made by Fuji Photo Film Co., Ltd.) having a gradient orientation layer of a discostic liquid-crystal polymer adhesively supported by a transparent film base of triacetyl cellulose with a water absorption coefficient of 3.5% and a photoelectric coefficient of $5 \times 10^{-12}$ m$^2$/N was used.

Evaluation Test 2

In each of the samples obtained in Examples 3, 4 and Comparative Example 2, the optically compensatory polarizing plates were bonded to both sides of a glass plate through their adhesive layers so that the polarizing plates were arranged into the form of cross Nicol (a black display state with axes of polarization of 45 degrees and 135 degrees). The resulting laminate was subjected to a durability test in which the resulting laminate was left in an atmosphere of 60° C. and 90% RH for 120 hours (moisture resistance) or in an atmosphere of 80° C. for 120 hours (heat resistance). Then, the uniformity of a black state and the leakage of light were observed on a light. table by eyes to evaluate display quality.

Results of the observation were shown in the following Table.

|  | Moisture Resistance | Heat Resistance |
| --- | --- | --- |
| Example 3 | Good (*1) | Good (*1) |
| Example 4 | Good (*1) | Good (*1) |
| Comparative Example 2 | Bad owing to Light Leakaqe (*2) | Bad owing to Light Leakage (*2) |

*1: Uniform black state with no light leakage.
*2: Irregular black state with partial light leakage.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An optically compensatory film comprising:
   a birefringent phase retarder layer; and
   a transparent film base for adhesively supporting said birefringent phase retarder layer, said transparent film base having a specific gravity of not larger than 1.15 and having an photoelastic coefficient of not larger than $30 \times 10^{-12}$ m$^2$/N,
   wherein said transparent film base includes a polymer having a saturated cyclic structure in a molecule.

2. An optically compensatory polarizing plate comprising said optically compensatory film according to claim 1 and a polarizing plate, said phase retarder layer of said optically compensatory film being composed of a liquid-crystal polymer.

3. A liquid-crystal display device comprising a liquid-crystal cell, and said optically compensatory film according to claim 1 laminated on said liquid-crystal cell.

4. A liquid-crystal display device according to claim 3, further comprising a polarizing plate.

5. An optically compensatory film comprising:
   a birefringent phase retarder layer; and
   a transparent film base for adhesively supporting said birefringent phase retarder layer, said transparent film base having a water absorption coefficient of not higher than 1.0% at 23° C. and for 24 hours and having an photoelastic coefficient of not larger than $30 \times 10^{-12}$ m$^2$/N,
   wherein said transparent film base includes a polymer having a saturated cyclic structure in a molecule.

6. An optically compensatory polarizing plate comprising said optically compensatory film according to claim 5 and a polarizing plate, said phase retarder layer of said optically compensatory film being composed of a liquid-crystal polymer.

7. A liquid-crystal display device comprising a liquid-crystal cell, and said optically compensatory film according to claim 5 laminated on said liquid-crystal cell.

8. A liquid-crystal display device according to claim 7, further comprising a polarizing plate.

9. An optically compensatory film according to claim 1, wherein said polymer has at least one cyclic structure per a component monomer.

10. An optically compensatory film according to claim 5, wherein said polymer has at least one cyclic structure per a component monomer.

11. An optical compensatory film according to claim 1, wherein said polymer has no hydrophilic group per a component monomer.

12. An optically compensatory film according to claim 5, wherein said polymer has no hydrophilic group per a component monomer.

13. An optically compensatory film according to claim 1, wherein said polymer has two or less hydrophilic groups per a component monomer.

14. An optically compensatory film according to claim 5, wherein said polymer has two or less hydrophilic groups per a component monomer.

* * * * *